July 1, 1958  O. R. ARDREY  2,841,197
MEAT GRINDER HAVING PLURAL CUTTING MEANS
Filed April 29, 1955  2 Sheets-Sheet 1

INVENTOR.
OTIS R. ARDREY
BY
ATTORNEY

July 1, 1958  O. R. ARDREY  2,841,197
MEAT GRINDER HAVING PLURAL CUTTING MEANS
Filed April 29, 1955  2 Sheets-Sheet 2

INVENTOR.
OTIS R. ARDREY
BY Chester L. Davis
ATTORNEY

United States Patent Office 2,841,197
Patented July 1, 1958

2,841,197

MEAT GRINDER HAVING PLURAL CUTTING MEANS

Otis R. Ardrey, Hannibal, Mo.

Application April 29, 1955, Serial No. 504,769

4 Claims. (Cl. 146—182)

My invention relates to a meat grinder and more especially to an improved type of grinder which double grinds the meat as shown generally in my Patent No. 2,200,786 dated May 14, 1940.

An object of my invention is to provide an improved construction of meat grinder wherein the degree of fineness of the second grind may be manually controlled without the necessity of dismantling the machine to make the change.

A further object of my invention is to provide a machine which will double grind the material fed into it and wherein the shearing action is assured by the construction of the device so that under normal conditions of operation the disassembly of the machine for sharpening is rendered less necessary.

Figure 1:
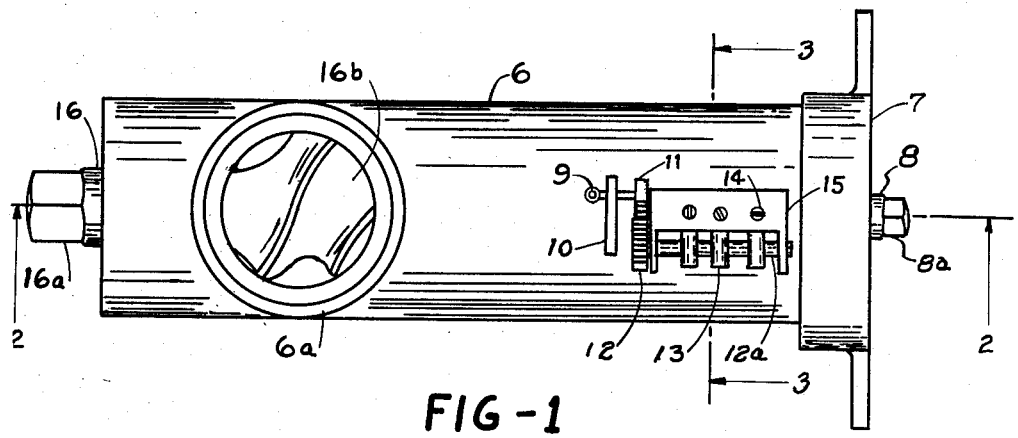
Figure 2:
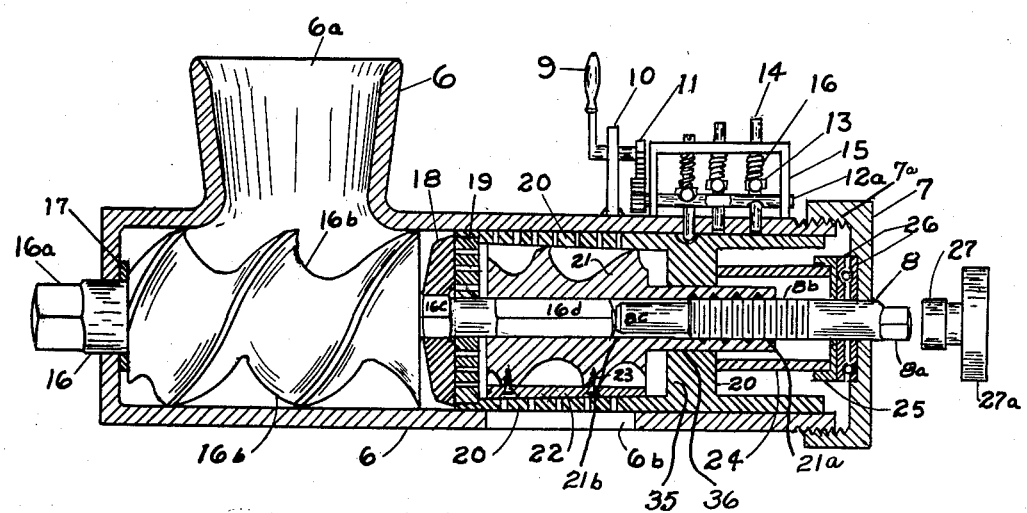
Figure 3:
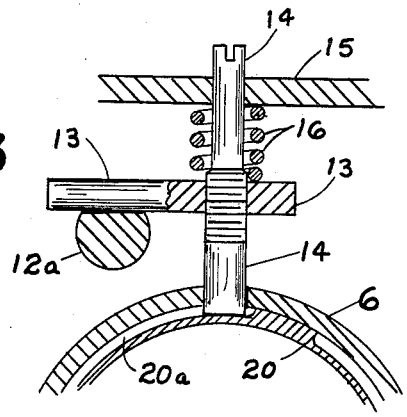
Figure 4A:
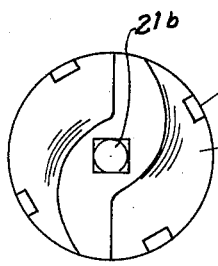
Figure 4:
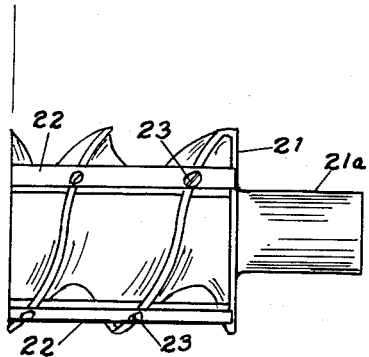
Figure 5:
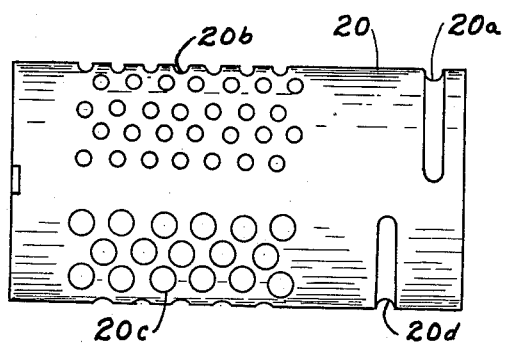
Figure 6:
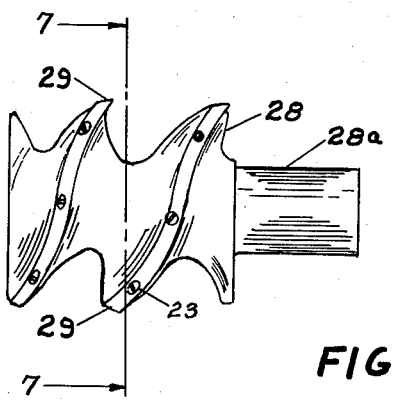
Figure 7:
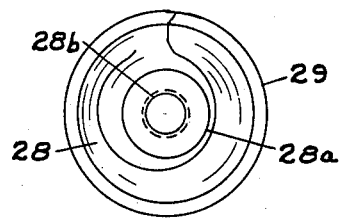

Other and further objects and advantages of the improved grinder of my invention will appear from the specification to follow and by reference to the accompanying drawings wherein: Fig. 1 is a top plan view of the grinder of my invention; Fig. 2 is a side view in section along section lines 2 shown in Fig. 1 of the grinder of my invention; Fig. 3 is an enlarged side view in section along section lines 3 shown in Fig. 1 of the selection and locking mechanism, Fig. 4 is an enlarged side view of the main feed worm. Fig. 4a is an end view of the worm having cutter blades attached as employed in the second grind section; Fig. 5 is a side view of the cylinder which is provided with the various shaped apertures as employed in the second grind section; Fig. 6 is a side view and Fig. 7 is an end view of a modified form of the main feed worm and cutter employed in the second grind section of my invention of an improved grinder.

Referring to the drawings in detail it will be observed that Fig. 1 shows a top view and Fig. 2 a side view in section and these two illustrations will be described together. A central housing 6 comprises the main body of the grinder and includes an intake opening or spout 6a located at the top and near one end of housing 6. An exit opening 6b is located near the bottom of housing 6 near the opposite end from intake opening 6a. One end of housing 6 is closed by a cap 7 which has an internally threaded lip 7a to engage with the external threads on the end of housing 6. Immediately beneath spout 6a is the worm 16b carried on the shaft 16. A washer 17 acts as an end bearing and packing medium. One end of shaft 16 has a squared shape indicated by the reference numeral 16a to which a crank or other source of motive power is applied and which may be of any type. Next to the other end of worm 16b on a squared section 16c is provided a cutter 18 which is in shearing engagement with an apertured plate 19. Shaft 16 extends through the center of plate 19 and partially through the second worm 21 as at 16d. Secured to the radial edges of worm 21 are provided the knives 22 or a single spiral knife 29, these being more particularly shown in Figs. 4 and 6 respectively. Knives 22 shown in Figs. 2, 4 and 4a, or spiral knife 29 shown in Figs. 6 and 7 are secured to worm 21 by means of screws 23. Knives 22 are in shearing engagement with the inner surface of an apertured cylinder 20, the cylinder being shown in greater detail in Fig. 5 as having groups of apertures 20b and 20c, each group of apertures being of a different size. Any number of groups of different size apertures may be employed in cylinder 20. Formed integral with cylinder 20 within the same is a partition 35 which has a central opening 36 and constitutes a support and bearing for the shaft extension 21a of worm 21. Shaft extension 21a has a central bore 21b into which a second shaft 8 extends, shaft 8 having a squared end 8a, a threaded section 8b and a pressure end section 8c. Threaded section 8b engages with a correspondingly threaded inside section of shaft extension 21a.

In operation of the grinder as thus far described worm 21 is free to move axially along shaft extension 16d. Shaft 8 having a threaded section 8b engaging with the internal threads in the extension 21a of worm 21, turning the squared end 8a of shaft 8 moves worm 21 in a horizontal direction. The cylinder 20 in the assembled structure, fits snugly within housing 6 and is restrained against axial movement by means of a bearing assembly at the right end thereof consisting of the sleeve 24 and the two parts of a bearing race 25 and 26. Bearing race 25 and 26 is bounded on the outside by the inside surface of cap 7, which cap as previously mentioned has a lip with internal threads engaging the threaded end portion of housing 6. The wrench 27 has a female squared opening to fit the squared end 8a of shaft 8, and has an enlarged flange 27a by means of which the shaft 8 may be screwed into or away from the hub 21a of worm 21. Since actually shaft 8 can not move axially the part which is moved is worm 21. Cylinder 20 has secured in one end thereof an apertured plate 19 and this plate carried by cylinder 20 is maintained in shearing engagement with the cutter 18 by the threaded adjustment of cap 7.

Attention is called to an important feature of my invention in that it will be observed that the inner surface or wall of the apertured cylinder 20 has a taper, that is, that the inside diameter of the cylinder 20 is less at the extreme right side of the apertured section than it is at the extreme left side of the apertured section. Worm 21 is likewise tapered in diameter, and the knives 22 tapered in thickness, so that in either event when the shaft 8 is turned the tapering of the worm and knives unit would cause the knives to come into shearing engagement with the correspondingly tapered apertured section of cylinder 20. While the taper generally employed is of the order of one to five degrees, it is understood that this may vary over a considerable range and it is sufficient to refer to the cylinder having an inside cutting apertured surface as cone-shaped and to refer to the worm with its associated knives as cone-shaped and fitting within the first cone-shaped cutting member, namely within cylinder 20. The two means of adjustment thus far described are the movement axially of cylinder 20 by means of which the cutter 18 is maintained in shearing engagement with the apertured plate 19, this being accomplished by advancing or retracting cap 7, the second adjustment being that of bringing and maintaining worm 21 and its associated knives 22 into shearing engagement with the apertured cutting section of cylinder 20 this being accomplished by advancing or retracting the threaded portion 8b of shaft 8 into more or less of the threaded portion of collar 21a of worm 21. As the shearing surfaces wear these adjustments can be changed without the necessity of taking the machine apart.

The third adjustment is the means for selecting the degree of fineness to which the product is to be ground. As previously explained the cylinder 20 is provided with a certain plural number of groups of apertures, each group being of different size openings. For convenience of illustration Fig. 5 shows groups of two sizes, however any number of groups may be employed. As previously mentioned the cylinder is free to rotate within housing 6 but obviously it must be locked in position should a double grind be desired. To accomplish this I provide a series of pins 14 mounted within a frame 15. These pins 14 are normally forced toward cylinder 20 but are lifted therefrom or allowed to lock the cylinder by means of cams and cam shaft 12a. Cam shaft 12a is actuated by means of a handle 9 of a crank extending through and driving gears 11. A standard 10 serves as a bearing for the crank shaft. It will be seen in Fig. 5 that I provide a series of slots 20a and 20d within cylinder 20 and such slots are associated with different groups of cutting apertures 20b and 20c respectively. Fig. 3 shows the lifting of the pins 14 by means of a rack and pinion arrangement, any suitable method by gears, cams or otherwise being satisfactory. As the lever 9 shown in Fig. 2 is moved into any one of several positions the pin selected by the position of the lever will drop into its appropriate groove in cylinder 20. It is not necessary to stop the machine to make the change in the fineness of grind desired, the cylinder when not locked by any pin will rotate unless and until a pin is dropped.

A description of the grinding operation is as follows. The starting product, usually large sections of meat, is fed into the intake opening 6a, referring to Fig. 2 of the drawings. A motive source is attached to the squared end 16a of shaft 16 to cause its rotation. The sections of meat are conveyed by worm 16b and the edges of the meat are forced as they rotate to pass through disk cutter 18 and apertured plate 19. Apertured plate 19 is stationary against rotation during the grinding operation. The chopped up pieces are then carried by the second worm 21 and compressed within a confined space while they are again cut by the rotating knives 22 carried by worm 21 and as they are being forced against the inside surface of apertured cylinder 20. The pieces, then twice ground, emerge from the exit opening 6b at the bottom of the machine. Certain adjustments are desirable and in fact necessary. Cylinder 20 carries the apertured disk 19 and the cylinder 20 rides in end-thrust ball race assembly 26 carried by end-cap 7. The end-cap 7 with its internal threads 7a is secured to the threaded end of housing 6, and it therefore follows that the manual rotation of cap 7 will advance the whole assembly including apertured disk 19 into a longitudinal position within housing 6 so that apertured disk 19 is in shearing contact with cutter 18. Retracting the rotation of cap 7 likewise will retract the assembly longitudinally so that it may be completely withdrawn from housing 6 altogether for purposes of cleaning. This adjustment longitudinally of the assembly takes care of certainty of shearing contact between cutter 18 and apertured plate 19 and makes unnecessary the use of tension springs to take up wear on the surfaces. As previously mentioned, the inner surface of apertured cylinder 20 is tapered and the inside surface is, at all times during grinding operation, maintained in shearing contact with the worm and knife assembly 21—22 which unit has an outside taper matching the inside taper of cylinder 20. The worm 21 with its knives 22 are brought into shearing engagement with apertured cylinder 20 by means of a wrench 27 applied to the squared end 8a of shaft 8, the threaded section 8b of shaft 8 engaging with inside threads of collar 21a of worm 21. It will thus be seen that a second adjustment is provided for maintaining shearing engagement, this being with the second cutter, the first with the cutter having already been described. As previously mentioned, the apertured cylinder 20 is held against rotation during grinding operation by means of pins 14. These are lifted from contact with locking apertures in cylinder 20, by means of cams 13 carried by cam-shaft 12a, and when not so lifted are forced into locking engagement with cylinder 20 because of springs 16. The cam-shaft 12a is actuated through gear train 11 and handle 9. The machine need not be stopped to change the degree of fineness desired, it being merely necessary to move the handle 9 a short distance which will lift one cam out of position and at the same time will allow another one to drop into locking position, the cylinder 20 moving in the direction the worm 21 is traveling, and thereby exposing apertures in and near the exit opening 6b of a size different from that just previously exposed. This, the place near exit opening 6a, being the only release for the compressed material, is then where the shearing engagement takes place and the finished product passes through the apertures of the cylinder where they may be caught by a container and used.

There are many modification of my invention possible without departing from the spirit of my invention. Instead of providing a plurality of knives 22 secured to worm 21 as shown in Fig. 4, one may provide a spiral shaped knife 29 secured by means of screws 30 or by any other means whereby an infinite number of cutting surfaces would result, such being shown in Fig. 6. It further is obvious that the worm 21 of Fig. 4 or the worm 28 of Fig. 6 can be manufactured by casting, the form therefor having the taper desired so that no special machining of the knives 22 or 29 is necessary to effect a taper in the assembled machine. It is further obvious that worm 21 or worm 28 may be manufactured with the outer edge case-hardened to serve as cutting edges. It is to be distinctly understood that my invention is to be limited only by the scope of the appended claims.

What I claim as my invention is:

1. In a grinding machine the combination of a housing, an opening on the top of said housing for admission of the material to be ground, an opening on the bottom of said housing for release of the final ground material, a worm having a leading end and a trailing end the same positioned immediately under the first mentioned opening, an apertured plate and a cutter in operative arrangement therewith aligned immediately adjacent to the leading end of said worm, a second worm having rigid knives attached to the periphery thereof, said second worm aligned axially with said first mentioned worm, an apertured cylinder aligned axially with said second mentioned worm and positioned above said opening on the bottom of said housing, said apertured cylinder having a plurality of groups of apertures with the size of the apertures in one group being different from the size of the apertures in other of said groups, said rigid knives being in shearing contact with the inner surface of said apertured cylinder, a common shaft extending axially through said worms causing their common rotation, and selectively operative means associated with said apertured cylinder to allow the rotation of said apertured cylinder or to lock said cylinder against rotation as desired.

2. A grinding machine as in claim 1 wherein the selectively operative means for said apertured cylinder, comprises cams and sliding pins, said pins being operatively associated with either of said plurality of groups of apertures in said cylinder.

3. A grinding machine as in claim 1 wherein means are operatively associated with said second worm to selectively adjust the frictional shearing contact between said rigid knives and said inner surface of said apertured cylinder.

4. In a grinding machine the combination of a housing, an opening on the top of said housing for admission of the material to be ground, an opening on the bottom of said housing for release of the final ground material, a worm having a leading end and a trailing end the same positioned immediately under the first mentioned opening, an apertured plate and associated cutter aligned immediately adjacent to the leading end of said worm, a second worm having rigid cutting edges, said worm aligned axially with said first mentioned worm, an apertured cylinder aligned axially with said second mentioned worm and positioned above said opening on the bottom of said housing, said apertured cylinder having locking recesses around the periphery thereof, said second worm and said apertured cylinder having correlated tapered and contacting surfaces, said second mentioned worm having its outermost edge in shearing contact with the inner surface of said apertured cylinder, and a common shaft extending axially through said worms causing their common rotation, said cylinder having a plurality of groups of apertures, the size of the apertures in each group being different from the size of the apertures in other of said groups and means for selectively allowing the rotation of said cylinder or the locking against rotation of said cylinder as desired in any position.

References Cited in the file of this patent

UNITED STATES PATENTS

| | | |
|---|---|---|
| 1,608,460 | Blankinship | Nov. 23, 1926 |
| 2,200,786 | Ardrey | May 14, 1940 |
| 2,216,023 | Schmidt | Sept. 24, 1940 |

FOREIGN PATENTS

| | | |
|---|---|---|
| 174,450 | Austria | Mar. 25, 1953 |
| 1,086,487 | France | Aug. 11, 1954 |